(12) United States Patent
Allemand

(10) Patent No.: US 6,868,616 B2
(45) Date of Patent: Mar. 22, 2005

(54) BUILDER'S MEASURING AND MARKING TOOL

(76) Inventor: James S. Allemand, 66 Timberline, Lemont, IL (US) 60439

( * ) Notice: Subject to any disclaimer, the term of this patent is extended or adjusted under 35 U.S.C. 154(b) by 0 days.

(21) Appl. No.: 10/795,045

(22) Filed: Mar. 5, 2004

(65) Prior Publication Data

US 2004/0231175 A1 Nov. 25, 2004

Related U.S. Application Data

(60) Provisional application No. 60/453,099, filed on Mar. 7, 2003.

(51) Int. Cl.[7] .............................. B43L 7/027; B43L 13/00
(52) U.S. Cl. .............................. 33/476; 33/474; 33/481; 33/429
(58) Field of Search ........................... 33/416–418, 423, 33/427, 429, 474–476, 479–482, 679.1

(56) References Cited

U.S. PATENT DOCUMENTS

| | | | |
|---|---|---|---|
| 614,144 A | * 11/1898 | Thompson | ................... 33/476 |
| 1,619,427 A | 3/1927 | McCaffery, Jr. | |
| 2,556,781 A | * 6/1951 | Smithson | ................... 33/423 |
| 2,654,954 A | * 10/1953 | Lawrence | ................... 33/423 |
| 4,404,753 A | 9/1983 | Klok | |
| 4,461,092 A | 7/1984 | Hore | |
| 4,742,619 A | 5/1988 | Swanson | |
| 4,773,163 A | 9/1988 | Wolford, Jr. | |
| 4,926,564 A | 5/1990 | Loggins | |
| 5,170,568 A | 12/1992 | Wright | |
| 5,456,015 A | 10/1995 | Butcher et al. | |
| D369,981 S | 5/1996 | Hayes et al. | |
| 5,575,074 A | 11/1996 | Cottongim et al. | |
| 5,727,325 A | 3/1998 | Mussell | |
| D422,225 S | 4/2000 | DiGangi et al. | |
| 6,122,834 A | * 9/2000 | Rester | ......................... 33/474 |
| 6,230,416 B1 | 5/2001 | Trigilio | |
| D445,700 S | 7/2001 | Mapston | |
| 6,393,710 B1 | 5/2002 | Hastings | |
| 6,622,394 B2 | 9/2003 | Werner et al. | |

* cited by examiner

Primary Examiner—G. Bradley Bennett
(74) Attorney, Agent, or Firm—Brinks Hofer Gilson & Lione

(57) ABSTRACT

In one aspect of the invention, a builder's measuring and marking tool is provided. The tool comprises a planar member having a right triangle configuration, including a first side edge, a second side edge extending normal to the first side edge, and a third side edge intersecting the first and second side edges to form a hypotenuse of the right triangle configuration. The tool also comprises an elongated aperture spaced apart inwardly from the third side edge and bounded by at least one straight edge parallel to the third side edge, and first hip and valley marking indicia formed along the at least one straight edge of the elongated aperture. In addition, the tool comprises an aperture having a first inner side edge parallel to the at least one straight edge of the elongated aperture and second hip and valley marking indicia formed along the first inner side edge.

13 Claims, 4 Drawing Sheets

BUILDER'S MEASURING AND MARKING TOOL

RELATED APPLICATION

This application claims the benefit pursuant to 35 U.S.C. §119(e) of Provisional U.S. Patent Application Ser. No. 60/453,099 filed on Mar. 7, 2003, which is expressly incorporated herein by reference.

BACKGROUND

This invention relates to the field of measuring and marking tools such as a roofing square for use in roofing or construction framework. Various triangular-shaped roofing squares are known for use in basic roof construction. These allow a carpenter to measure and cut different types of rafters for framing a roof, including common rafters and hip and valley rafters. For example, known roofing squares allowed a user to mark hip and valley plumb cuts using only one measurement scale, such a scale of unit rise values.

Further, known roofing squares enable a carpenter to mark a level or seat cut on a rafter by aligning a specific feature of the square with a plumb line, wherein the sole purpose of the feature is for making a seat cut. If other structures for implementing different functions are added to the square, the location and configuration of a seat cut feature may need to be changed. This can adversely affect the utility of the seat cut feature by making it more difficult for a carpenter to precisely align the feature with a plumb line.

Accordingly, there continues to be a need for a roofing square having simple and effective means for marking different types of cuts for rafters for framing a roof.

BRIEF SUMMARY

In one aspect of the invention, a builder's measuring and marking tool is provided. The tool comprises a planar member having a right triangle configuration, including a first side edge, a second side edge extending normal to the first side edge, and a third side edge intersecting the first and second side edges to form a hypotenuse of the right triangle configuration. The tool also comprises an elongated aperture spaced apart inwardly from the third side edge and bounded by at least one straight edge parallel to the third side edge. The tool further comprises first hip and valley marking indicia formed along the at least one straight edge of the elongated aperture. In addition, the tool comprises an aperture having a first inner side edge parallel to the at least one straight edge of the elongated aperture and second hip and valley marking indicia formed along the first inner side edge.

In yet one aspect of the invention, a builder's measuring and marking tool is also provided. The tool comprises a planar member having a right triangle configuration, including a first side edge, a second side edge extending normal to the first side edge, and a third side edge intersecting the first and second side edges to form a hypotenuse of the right triangle configuration. The tool also comprises an elongated aperture spaced apart inwardly from the third side edge and bounded by opposite straight edges parallel to the third side edge. The tool further comprises a scribe bar spaced apart inwardly from the second side edge having at least one scribing edge parallel to the second side edge. The scribing edge includes at least one indentation at the predetermined distance from the first side edge. In addition, the tool comprises an aperture in the form of a right triangle having a first inner side edge intersecting a second inner side edge at a right angle and a third inner side edge representing the hypotenuse of the right triangle aperture. The third inner side edge is parallel to the opposite straight edges of the elongated aperture.

In yet another aspect of the invention, a builder's measuring and marking tool is also provided. The tool comprises a planar member having a right triangle configuration, including a first side edge, a second side edge extending normal to the first side edge, and a third side edge intersecting the first and second side edges to form a hypotenuse of the right triangle configuration. The intersection of the first and second side edges defines a pivot point. The tool also comprises abutment means along the first side edge for abutting against a work piece when the second side edge is positioned to extend over the work piece. The tool further comprises distance marking indicia formed along the second side edge for marking a distance from the first side edge, including a predetermined distance corresponding to a standard width of a piece of timber. The tool further comprises angle marking indicia formed along the third side edge for marking an angle and for marking a degree measurement for a common rafter plumb line. The tool further comprises a scribe bar spaced apart inwardly from the second side edge. The scribe bar has at least one scribing edge parallel to the second side edge. The scribing edge includes at least one indentation at the predetermined distance from the first side edge corresponding to a standard width of a piece of timber. The tool further comprises an elongated aperture spaced apart inwardly from the third side edge and bounded by opposite straight edges parallel to the third side edge. The tool further comprises common rafter marking indicia formed along a first straight edge of the elongated aperture for marking a unit rise measurement for a common rafter plumb line. The tool further comprises first hip and valley marking indicia formed along a second straight edge of the elongated aperture for marking a unit rise or a degree measurement for a hip and valley rafter plumb line. The tool further comprises an aperture in the form of a right triangle having a first inner side edge intersecting a second inner side edge at a right angle and a third inner side edge representing the hypotenuse of the right triangle aperture. The third inner side edge is parallel to the opposite straight edges of the elongated aperture. The tool further comprises second hip and valley marking indicia formed along the third inner side edge for marking a unit rise or a degree measurement, whichever is not marked using the first hip and valley marking indicia. The tool further comprises linear marking indicia formed along the first inner side edge representing the distance from the second side edge.

In yet another aspect of the invention, a method of marking a seat cut on a work piece using a builder's measuring and marking tool is provided. The tool comprises a planar member having a right triangle configuration, including a first side edge and a second side edge extending normal to the first side edge, abutment means along the first side edge, a distance marking indicia formed along the second side edge for marking a distance from the first side edge, including a predetermined distance corresponding to a standard width of a piece of timber, and a scribe bar spaced apart inwardly from the second side edge having at least one scribing edge parallel to the second side edge, including at least one indentation located at the predetermined distance from the first side edge. The method comprises drawing a plumb line on the work piece; placing the builder's measuring and marking tool on the work piece with the abutment means along a side edge of the work piece; sliding the builder's measuring and marking tool along the side edge of the work piece until the distance marking indicia for marking the predetermined distance overlays the plumb line; pivoting the builder's measuring and marking tool about a pivot defined by the intersection of the first and second side edges until the plumb line intersects both the distance marking indicia for marking the predetermined distance and the indentation of the scribe bar located at the predetermined distance from the first side edge; and marking a seat cut line along the second straight edge of the tool from the plumb line to the side edge of the work piece.

DETAILED DESCRIPTION OF THE DRAWINGS AND THE PRESENTLY PREFERRED EMBODIMENTS

Figure 1:
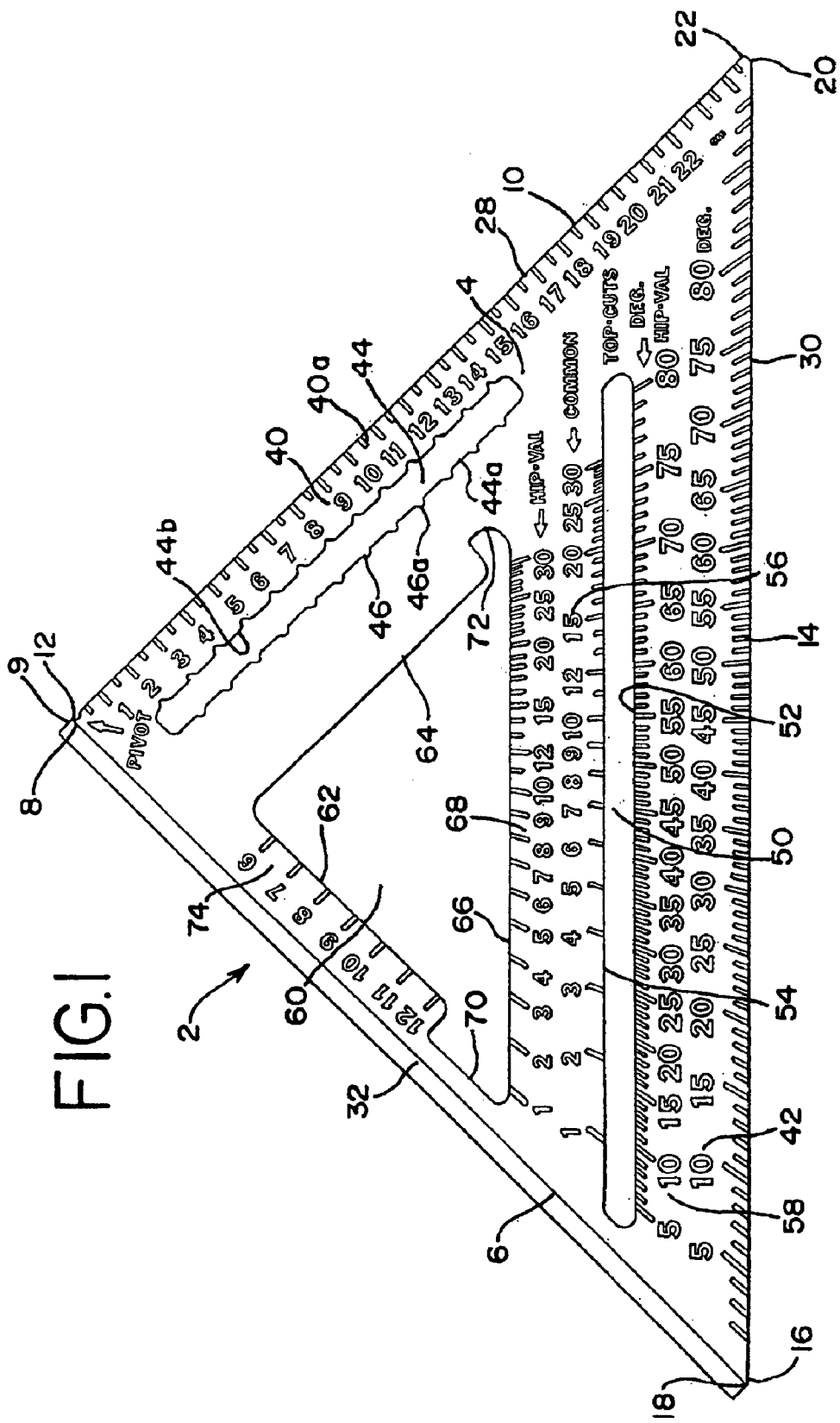
FIG. 1 is a plan view of a builder's measurement and marking tool in accordance with this invention.
Figure 2:
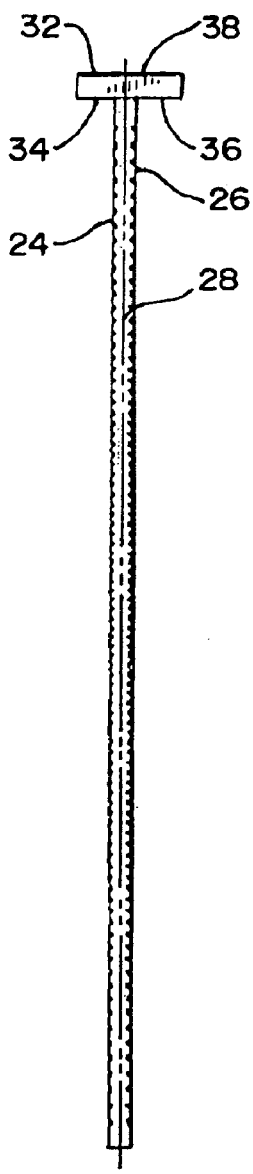
FIG. 2 is a partial elevation view of the builder's measurement and marking tool of FIG. 1.

A builder's measurement and marking tool 2 in accordance with this invention is illustrated in FIGS. 1 and 2. The exemplary tool 2 is provided with various marking indicia that define metric measurement units. However, it will be readily understood that the metric scale is not the only measurement scale for implementing the present invention, and that the tool 2 may use marking indicia that define other measurement units, such as English measurement units of inches.

As shown in FIG. 1, the builder's measurement and marking tool 2 comprises a planar member 4 having a right triangle peripheral configuration, sometimes referred to as a roofing square, including a first side edge 6 having a first end 8 which intersects at a right angle with a second side edge 10 at its first end 12, forming a pivot point 9. Planar member 4 also has a third side edge 14 forming the hypotenuse of the right triangle tool 2 with opposite ends 16 and 20. The third side edge 14 is intersected at one end 16 by the first side edge 6 at its opposite end 18 and at the opposite end 20 by the second side edge 10 at its opposite end 22.

The measurement and marking tool 2 has a first planar surface 24 facing in one direction and a second planar surface 26 facing in the opposite direction, such surfaces being parallel and spaced apart, for example a distance of about three sixteenths to a quarter of an inch, as shown in FIG. 2. A first smooth straight edge wall surface 28 extends between such planar surfaces along the second side edge 10 to provide a marking edge along which a pencil can be drawn to mark a straight smooth line. A second smooth straight edge wall surface 30 extends between the planar surfaces along the third side edge 14 to also provide a smooth marking edge along that side of the tool 2.

As shown in FIG. 2, a T bar 32 is provided along the first side edge 6, having a first ledge 34 with a planar surface extending outwardly a short distance of about a fourth of an inch from and normal to the first planar surface 24 facing inwardly theretoward, and a second ledge 36 with a planar surface extending outwardly a short distance of about a fourth of an inch from and normal to the second oppositely facing planar surface 26 facing inwardly theretoward. The T bar 32 has an oppositely facing planar surface 38 facing outwardly and away from the tool 2. These dimensions for the first and second ledges 34 and 36 are only illustrative and are not meant to be limiting. Those skilled in the art will readily recognize that the T bar 32 can have other dimensions as well, and that other projections, lips, or flanges may be used as abutment means instead of ledge 34 or ledge 36 to provide a stop against which the first side edge 6 may rest.

Referring again to FIG. 1, the second side edge 10 has distance marking indicia 40 alongside it, starting from the end 12 adjacent end 8 of first side edge 6. In the present embodiment, distance marking indicia 40 are formed on both the first planar surface 24 and second planar surface 26 in half centimeter increments and with numerals to indicate each successive centimeter beginning with the numeral 1 to indicate the first centimeter away from end 8 of the first side edge 6.

The hypotenuse or third side edge 14 has angle marking indicia 42 formed alongside it on both the first planar surface 24 and second planar surface 26. In the present embodiment, the angle marking indicia 42 define a scale of degrees starting from the end 16 of the third side edge adjacent end 18 of first side edge 6.

The measurement and marking tool 2 in accordance with this invention further includes a scribe bar 44 located parallel to the second side edge 10 and spaced apart inwardly therefrom, for example a distance of about five eighths of an inch. The scribe bar 44 is bounded by parallel scribing edges 44a and 44b, each having indentations 46 corresponding to distance marking indicia 40 formed along the second side edge 10. In the present embodiment, successive indentations 46 alternate between the scribing edges 44a and 44b to define increments of one half centimeter between successive indentations 46. This configuration also defines one centimeter increments between adjacent indentations 46 formed in either of scribing edges 44a and 44b. The scribe bar 44 includes an indentation 46a corresponding to a marking indicia 40a, which is formed at a distance of ten and a half centimeters or the standard metric width for a piece of lumber or timber from end 8 of the first side edge 6.

The measurement and marking tool 2 in accordance with this invention also includes an elongated aperture 50 bounded by parallel straight edges 52 and 54. This aperture is parallel to the hypotenuse or third side edge 14 of the square 2 and is spaced apart inwardly therefrom, for example a distance of about an inch and a quarter. First hip and valley marking indicia 58 are formed on both the first planar surface 24 and second planar surface 26 along straight edge 52 of elongated aperture 50. In the present embodiment, for example, first hip and valley marking indicia 58 define a scale of degrees for measuring plumb lines for hip and valley rafters.

Common rafter marking indicia 56 are formed on both the first planar surface 24 and second planar surface 26 along straight edge 54 of elongated aperture 50 for measuring plumb lines for common rafters. In the present embodiment, for example, common rafter marking indicia 56 define a scale of unit rise values corresponding to the rise in centimeters per every 10 centimeters of horizontal rafter run.

The measurement and marking tool 2 also includes a generally triangular aperture 60 in the form of a right triangle, having a first inner side edge 62 which intersects a second inner side edge 64 at a right angle, and a third inner side edge 66 representing the hypotenuse. The hypotenuse or third inner side edge 66 is parallel to the straight edges 52 and 54 of the elongated aperture 50, and is spaced apart from straight edge 54, for example a distance of about three fourths of an inch. The first inner side edge 62 of the triangular aperture 60 is parallel to the first inner side edge 6 of the tool 2, and spaced apart inwardly thereof, for example a distance of about five eights of an inch. The second inner side edge 64 of the triangular aperture 60 is parallel to the second side edge 10 of the tool 2, and spaced apart inwardly therefrom, for example a distance of about two inches. In particular, the second inner side edge 64 may be spaced inwardly from the second side edge 10 at a distance that corresponds to a standard metric stud size for a piece of lumber or timber. In addition, the scribing edge 44a of the scribe bar 44 may be spaced inwardly from the second side edge 10 at a distance that corresponds to one-half of the standard metric stud size for a piece of lumber or timber.

Second hip and valley marking indicia 68 are formed on both the first planar surface 24 and second planar surface 26 along the third inner side edge 66 representing the hypotenuse of the triangular aperture 60 for measuring plumb lines for hip and valley rafters. In the present embodiment, second hip and valley marking indicia 68 define a scale that is different from first hip and valley marking indicia 58, for example, a scale of unit rises corresponding to the centimeter rise per about 14 centimeters of horizontal rafter run. Notches 70 and 72 preferably are formed at the ends of the hypotenuse or third inner side edge 66 intersecting the first and second inner side edges 62 and 64, respectively, to allow the user to mark measurements for a hip and valley rafters using the second hip and valley marking indicia 68 formed thereon near the ends of the third inner side edge 66.

Linear marking indicia 74 are formed on both opposite planar surfaces 24 and 26 of the square 2 along the first inner side edge 62 of the triangular aperture 60, starting with a mark representing the distance along the inner side edge 62 from the second side edge 10 of the tool 2. In the present embodiment, for example, linear marking indicia 74 are formed in one centimeter increments and with numerals to indicate each successive centimeter beginning with the numeral 6 to indicate the sixth centimeter away from the second side edge 10.

Figure 3:
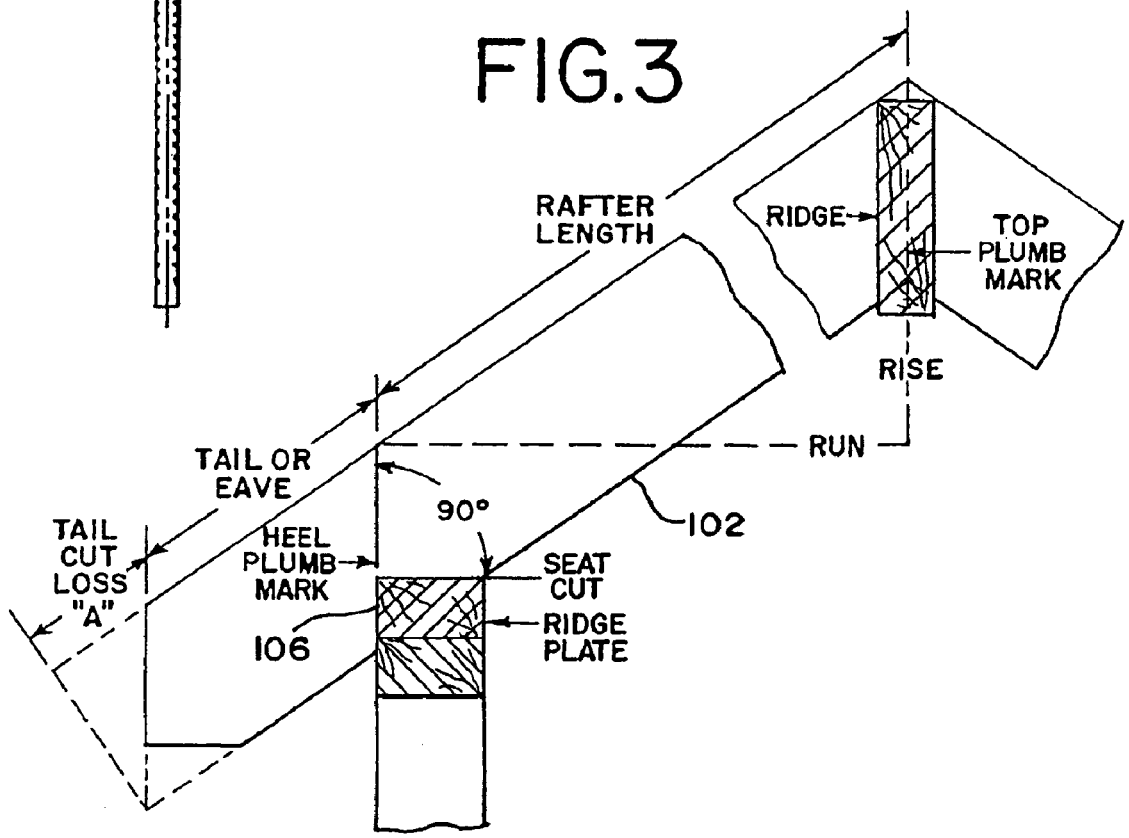
FIG. 3 illustrates a seat cut or birdsmouth on a common rafter.

One use of the measurement and marking tool 2 in accordance with the present invention as described is in marking triangular seat cuts in pieces of lumber or timber to be used as common rafters, such seat cuts commonly referred to in the trade as birdsmouths. These are the cut-outs which receive and rest on the ridge plate of a building wall when the common rafter is put in place extending obliquely upwardly from the ridge plate of the wall at the desired angle. FIG. 3 illustrates a birdsmouth 106 for a work piece 102. One side edge of the birdsmouth 106 extends vertically in abutment against the vertical side wall of the ridge plate and the other side edge of the birdsmouth extends horizontally and rests on and against the upwardly facing, horizontally extending surface of the ridge plate.

Figure 4:
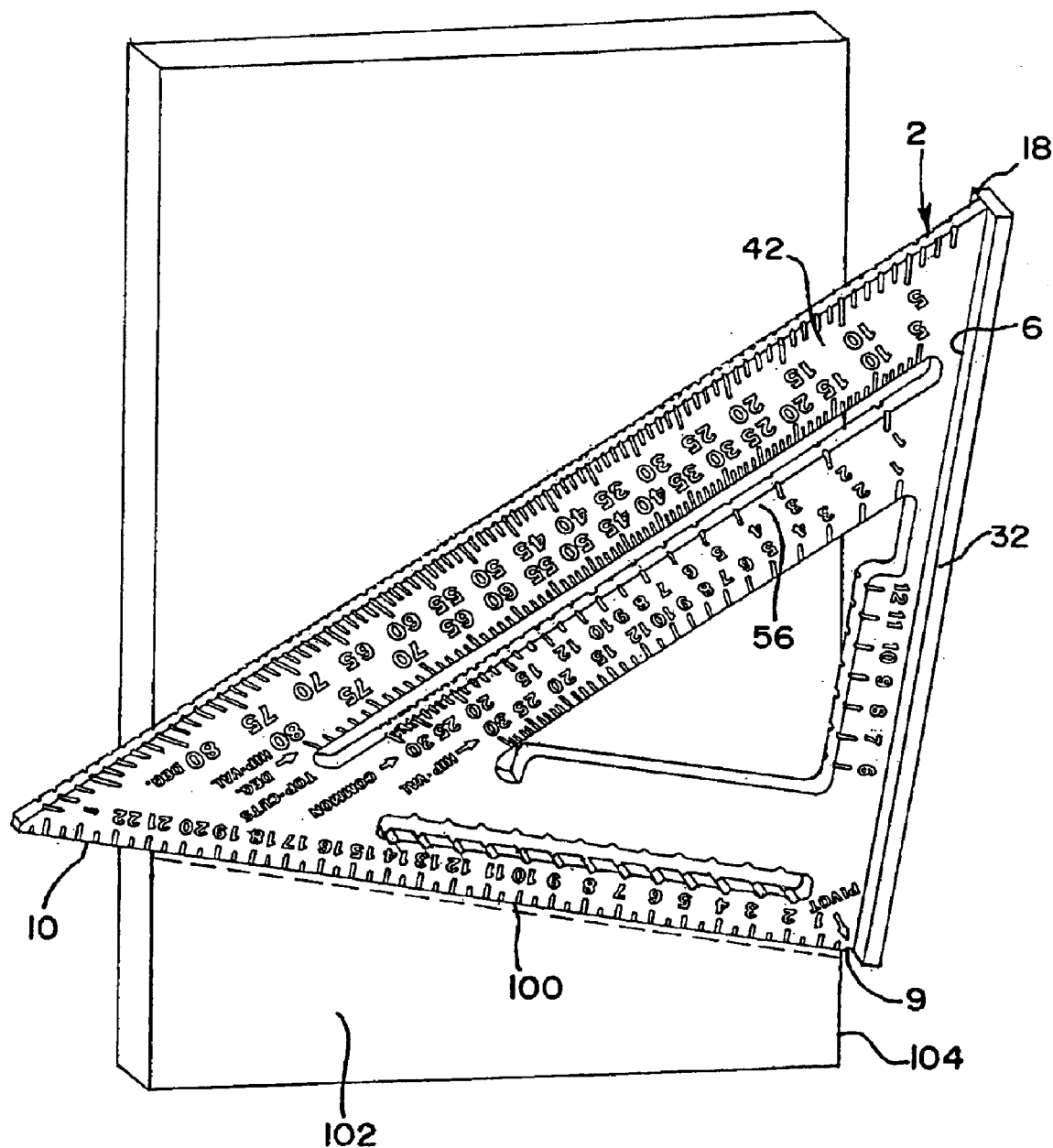
FIG. 4 is a perspective view of the builder's measurement and marking tool of FIG. 1 used to mark a plumb line on a common rafter.

A plumb line 100 is first drawn on the work piece 102 to be made into a common rafter, as shown in FIG. 4. In this case, the plumb line 100 represents the vertical when the common rafter is in place. For marking the plumb line 100, the user places the tool 2 on the work piece 102 with the T bar 32 pressed along the side edge 104 of the work piece 102 and slides the tool to the desired location on the work piece. The tool is rotated about the pivot point 9 such that the end 18 of the first side edge 6 moves away from the side edge 104 of the work piece 102 until the desired unit rise measurement value of common rafter marking indicia 56 is aligned with the side edge 104. Alternatively, a user can rotate the tool away from the side edge 104 until the desired degree measurement value of angle marking indicia 42 is aligned with the side edge 104. The common rafter plumb line 100 is drawn along the second side edge 10 of the tool 2.

Figure 5:
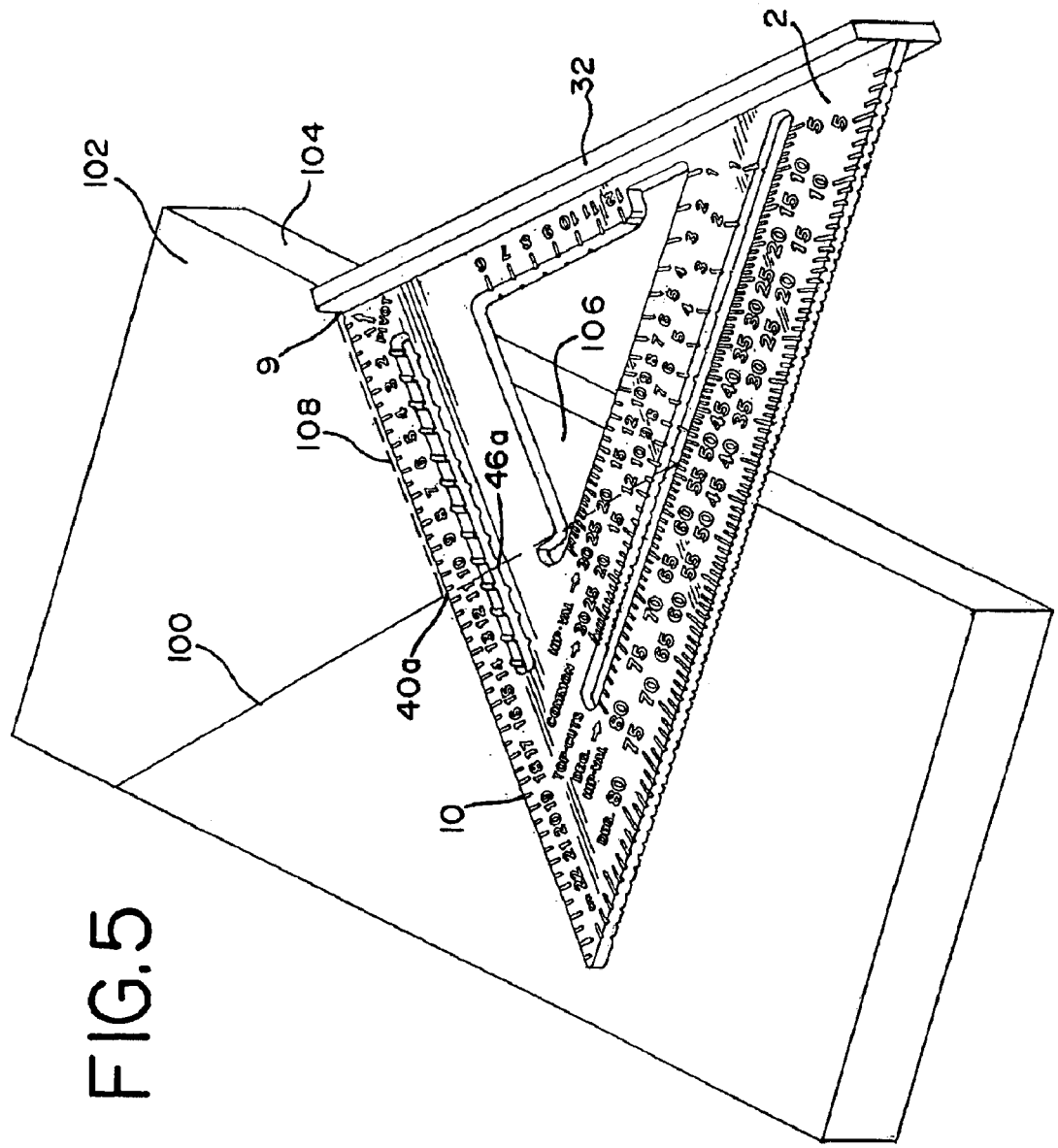
FIG. 5 is a perspective view of the builder's measurement and marking tool of FIG. 1 used to mark a seat cut or birdsmouth on a common rafter.

Then, the tool 2 is turned over on its opposing planar surface and placed on the work piece 102 with the T bar 32 pressed along the side edge 104 of the work piece 102 in which the birdsmouth 106 is to be cut. The second side edge 10 of the square 2 extends inwardly of the work piece which positions the ten and a half centimeter marking indicia 40a of distance marking indicia 40 inwardly a distance of ten and a half centimeters that corresponds to a standard metric width for a piece of lumber or timber. The user slides the tool 2 along the edge 104 of the work piece 102 until the ten and a half centimeter marking indicia 40a overlays the plumb line 100. The square 2 is then rotated about the pivot point 9 with the ten and a half centimeter marking indicia 40a over the plumb line 100 until the plumb line 100 intersects the ten and a half centimeter marking indicia 40a and the corresponding indentation 46a of the scribe bar 44, as shown in FIG. 5.

When the square 2 is pivoted to such position, the second side edge 10 extends at a right angle to the plumb line 100. A cut out line 108 is then drawn along the second side edge 10 from the plumb line 100 to the edge 104 of the work piece 102. Such cut out line 108 extends at a right angle to the plumb line 100. The birdsmouth 106 may then be cut out on the cut out line 108, and on the plumb line 100 from the edge 104 of the work piece 102 to its intersection point with the aforesaid cut out line 108, as shown in FIG. 5. When done this way, the portion of the birdsmouth 106 along the plumb line 100 will be in vertical abutment with the vertical side of the ridge plate and the portion cut out along the cut out line 108 will be in horizontal abutment resting on the horizontal surface of the ridge plate when the common rafter extends therefrom in its correct diagonal position at the desired angle.

Another use of the measurement and marking tool 2 in accordance with the present invention as described is in marking plumb lines for hip rafter and valley rafters using first and second hip and valley marking indicia 58 and 68. In particular, the tool 2 is placed on a work piece with the T bar 32 pressed along a side edge of the work piece. The tool 2 is pivoted about the pivot point 9 such that the end 18 of the first side edge 6 moves away from the side edge of the work piece until the desired unit rise measurement value of the second hip and valley marking indicia 68 is aligned with the side edge of the work piece or the desired degree measurement value of the first hip and valley marking indicia 58 is aligned with the side edge of the work piece. A hip and valley plumb line is drawn on the work piece along the second side edge 10 of the tool 2.

The measurement and marking tool 2 in accordance with the present invention as described can also be used to scribe a line perpendicular to the edge of a work piece or a line parallel to the edge of a work piece. In particular, the tool 2 is placed on a work piece with the T bar 32 pressed along the side edge of a work piece. For scribing a perpendicular line, a user draws a line on the work piece along the second side edge 10 of the tool 2. For scribing a parallel line, a user places a pencil in an indentation 46 of the scribe bar 44 and slides the tool 2 along the side edge of the work piece while keeping the T bar 32 pressed along the side edge.

Furthermore, the measurement and marking tool 2 in accordance with the present invention as described can be used to scribe a pair of lines perpendicular to the edge of a work piece, such as a sole plate, corresponding to a standard stud size for a piece of lumber or timber. In particular, the tool 2 is placed on a work piece with the T bar 32 pressed along the side edge of a work piece. A user then draws a first line on the work piece along the second side edge 10 of the tool 2 and a second line on the work piece along the second inner side edge 64 of the triangular aperture 60. The first and second lines delineate the placement of a stud piece on the work piece. The user can also scribe a center line for the stud piece by drawing a line on the work piece along the scribing edge 44*a* of the scribe bar 44.

In addition, the measurement and marking tool 2 in accordance with the present invention as described can be used as a saw guide. For example, a user can position the tool 2 on a work piece with the pivot point 9 pressed along the side edge of a work piece in a manner described above for marking plumb lines for common rafters or for hip rafter and valley rafters. Then, the user can run a saw along the side edge 10 of the tool 2 to make a desired cut for the work piece. Those skilled in the art will recognize that the tool 2 can further be used as a protactor for laying out or measuring different angles using angle marking indicia 42 formed along the hypotenuse or third side edge 14 of the tool and also as a miter square to align work pieces at a 90 degree angle and a 45 degree angle.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

I claim:

1. A builder's measuring and marking tool comprising:
   a planar member including a first side edge and, a second side edge extending normal to said first side edge, and a third side edge intersecting said first and second side edges to form a hypotenuse of said right triangle configuration;
   an elongated aperture spaced apart inwardly from said third side edge and bounded by at least one straight edge parallel to said third side edge;
   first hip and valley marking indicia formed along said at least one straight edge of said elongated aperture;
   an aperture having a first inner side edge parallel to said at least one straight edge of said elongated aperture; and
   second hip and valley marking indicia formed along said first inner side edge.

2. The builder's measuring and marking tool of claim 1 further comprising common rafter marking indicia formed along a second straight edge of said elongated aperture measured using a unit rise measurement.

3. The builder's measuring and marking tool of claim 2 wherein said first hip and valley marking indicia are measured using one of a unit rise and a degree measurement and said second hip and valley marking indicia are measured using one of said unit rise and said degree measurement that is not marked using first hip and valley marking indicia.

4. The builder's measuring and marking tool of claim 2 further comprising abutment means along said first side edge for abutting against a work piece when said second side edge is positioned to extend over said work piece.

5. The builder's measuring and marking tool of claim 2 further comprising distance marking indicia formed along said second side edge for marking a distance from said first side edge, including a predetermined distance corresponding to a standard width of a piece of timber.

6. The builder's measuring and marking tool of claim 2 further comprising angle marking indicia formed along said third side edge for marking an angle and for marking a degree measurement for a common rafter plumb line.

7. The builder's measuring and marking tool of claim 5 further comprising a scribe bar spaced apart inwardly from said second side edge having at least one scribing edge parallel to said second side edge, said at least one scribing edge including at least one indentation at said predetermined distance from said first side edge.

8. The builder's measuring and marking tool of claim 1 wherein said aperture further includes a second inner side edge parallel to said first side edge of said planar member and linear marking indicia formed along said second inner side edge representing the distance from said second side edge of said planar member.

9. The builder's measuring and marking tool of claim 8 wherein said aperture further includes a third inner side edge parallel to said second side edge of said planar member and spaced inwardly from said second side edge at a predetermined distance corresponding to a standard size for a stud.

10. The builder's measuring and marking tool of claim 8 wherein said scribe bar has at least one scribing edge spaced inwardly from said second side edge at a predetermined distance corresponding to one half of a standard size for a stud.

11. A builder's measuring and marking tool comprising:
    a planar member having a right triangle configuration, including a first side edge, a second side edge extending normal to said first side edge, and a third side edge intersecting said first and second side edges to form a hypotenuse of said right triangle configuration;
    an elongated aperture spaced apart inwardly from said third side edge and bounded by opposite straight edges parallel to said third side edge;
    a scribe bar spaced apart inwardly from said second side edge having at least one scribing edge parallel to said second side edge, said at least one scribing edge including at least one indentation at a predetermined distance from said first side edge corresponding to a standard width of a piece of timber; and
    an aperture in the form of a right triangle having a first inner side edge intersecting a second inner side edge at a right angle and a third inner side edge representing the hypotenuse of said right triangle aperture, said third inner side edge being parallel to said opposite straight edges of said elongated aperture.

12. A builder's measuring and marking tool comprising:
    a planar member having a right triangle configuration, including a first side edge, a second side edge extending normal to said first side edge, and a third side edge intersecting said first and second side edges to form a hypotenuse of said right triangle configuration, wherein the intersection of said first and second side edges defines a pivot point;
    abutment means along said first side edge for abutting against a work piece when said second side edge is positioned to extend over said work piece;
    distance marking indicia formed along said second side edge for marking a distance from said first side edge, including a predetermined distance corresponding to a standard width of a piece of timber;

angle marking indicia formed along said third side edge for marking an angle and for marking a degree measurement for a common rafter plumb line;

a scribe bar spaced apart inwardly from said second side edge having at least one scribing edge parallel to said second side edge, said at least one scribing edge including at least one indentation at said predetermined distance from said first side edge;

an elongated aperture spaced apart inwardly from said third side edge and bounded by opposite straight edges parallel to said third side edge;

common rafter marking indicia formed along a first straight edge of said elongated aperture for marking a unit rise measurement for a common rafter plumb line;

first hip and valley marking indicia formed along a second straight edge of said elongated aperture for marking one of a unit rise and a degree measurement for a hip and valley rafter plumb line;

an aperture in the form of a right triangle having a first inner side edge intersecting a second inner side edge at a right angle and a third inner side edge representing the hypotenuse of said right triangle aperture, said third inner side edge being parallel to said opposite straight edges of said elongated aperture;

second hip and valley marking indicia formed along said third inner side edge for marking one of said unit rise and said degree measurement that is not marked using first hip and valley marking indicia; and linear marking indicia formed along said first inner side edge representing the distance from said second side edge.

13. A method of marking a seat cut on a work piece using a builder's measuring and marking tool comprising a planar member having a right triangle configuration, including a first side edge and a second side edge extending normal to said first side edge, abutment means along said first side edge, a distance marking indicia formed along said second side edge for marking a distance from said first side edge, including a predetermined distance corresponding to a standard width of a piece of timber, and a scribe bar spaced apart inwardly from said second side edge having at least one scribing edge parallel to said second side edge, said at least one scribing edge including at least one indentation located at said predetermined distance from said first side edge, said method comprising:

drawing a plumb line on said work piece;

placing said builder's measuring and marking tool on said work piece with said abutment means along a side edge of said work piece;

sliding said builder's measuring and marking tool along said side edge of said work piece until said distance marking indicia for marking said predetermined distance overlays said plumb line;

pivoting said builder's measuring and marking tool about a pivot defined by the intersection of said first and second side edges until said plumb line intersects said distance marking indicia for marking said predetermined distance and said at least one indentation of said scribe bar located at said predetermined distance from said first side edge; and marking a seat cut line along said second straight edge of the tool from said plumb line to said side edge of said work piece.

* * * * *